United States Patent [19]

Tachibana et al.

[11] Patent Number: 5,286,618
[45] Date of Patent: Feb. 15, 1994

[54] METHOD FOR PROVIDING ANTISTATIC LAYER

[75] Inventors: Noriki Tachibana; Yoichi Saito; Kiyokazu Morita, all of Hino, Japan

[73] Assignee: Konica Corporation, Tokyo, Japan

[21] Appl. No.: 895,151

[22] Filed: Jun. 5, 1992

Related U.S. Application Data

[63] Continuation of Ser. No. 823,601, Jan. 15, 1992, abandoned, which is a continuation of Ser. No. 612,543, Nov. 13, 1990, abandoned.

[30] Foreign Application Priority Data

Nov. 29, 1989 [JP] Japan ................. 1-309574

[51] Int. Cl.$^5$ .............................. G03B 1/85
[52] U.S. Cl. .................... 430/529; 428/240; 428/327; 430/523; 430/527
[58] Field of Search ............... 428/240, 327; 430/523, 430/527, 529

[56] References Cited

U.S. PATENT DOCUMENTS

| | | |
|---|---|---|
| 2,976,148 | 3/1961 | Walford et al. ............ 430/529 |
| 3,017,280 | 1/1962 | Yudelson . |
| 3,507,837 | 4/1970 | Hidinger, Jr. . |
| 4,225,665 | 9/1980 | Schadt ......................... 430/529 |
| 4,251,626 | 2/1981 | Minamizono et al. ............ 430/529 |
| 4,266,016 | 5/1981 | Date et al. ........................ 430/529 |
| 4,308,332 | 12/1981 | Upson et al. ................... 430/529 |
| 4,585,730 | 4/1986 | Cho .................................. 430/529 |
| 4,701,403 | 10/1987 | Miller ............................ 430/529 |
| 4,916,017 | 4/1990 | Miller ............................ 430/529 |
| 4,960,687 | 10/1990 | Cho .................................. 430/529 |

FOREIGN PATENT DOCUMENTS 0360212 3/1990 European Pat. Off. .
1318263 5/1973 United Kingdom .

*Primary Examiner*—Jack P. Brammer
*Attorney, Agent, or Firm*—Frishauf, Holtz, Goodman & Woodward

[57] ABSTRACT

There is disclosed a method for providing an antistatic layer containing a water-soluble conductive polymer and a curing agent on a plastic film by coating, which comprises coating an aqueous processing solution containing the water-soluble conductive polymer and the curing agent on the plastic film to have a pH of the surface of the antistatic layer after drying the plastic layer of 8.5 or less and 2.5 or more.

9 Claims, No Drawings

METHOD FOR PROVIDING ANTISTATIC LAYER

This application is a continuation of application Ser. No. 07/823,601, filed Jan. 15, 1992 (abandoned), which is a continuation of application Ser. No. 07/612,543 filed on Nov. 13, 1990 (abandoned).

BACKGROUND OF THE INVENTION

This invention relates to a method for providing an antistatic layer for a plastic film, particularly to a method for preparing a light-sensitive silver halide photographic material excellent in antistatic ability.

Generally speaking, plastic films have strong chargeability, which gives many restrictions in uses in many examples. For example, in light-sensitive silver halide photographic materials, supports such as polyethylene terephthalate have been generally used, which are liable to be charged particularly at lower humidity during winter season. In recent days, when high sensitivity photographic emulsions are coated at high speed, or light-sensitive materials of high sensitivity are subjected to exposure treatment through an automatic printer, antistatic countermeasures are particularly important.

When a light-sensitive material is charged, static marks may appear by its discharging, or a foreign matter such as dust may be attached, whereby pinholes may be generated to deteriorate quality markedly and workability is lowered extremely for correction thereof. For this reason, antistatic agents have been generally used in light-sensitive materials, and recently, fluorine-containing surfactants, cationic surfactants, amphoteric surfactants, surfactants or polymeric compounds containing polyethylene oxide groups, polymers containing sulfonic acid or phosphoric acid groups in the molecule have been employed.

Particularly, chargeability control with a fluorine-containing surfactant or conductivity improvement with a conductive polymer has been frequently used and, for example, in Japanese Unexamined Patent Publications No. 91165/1974 and No. 121523/1974, examples of applying an ion type polymer having dissociable group in the polymer main chain are disclosed.

However, in these prior art techniques, the antistatic ability will be deteriorated to a great extent by developing processing. This may be considered to be due to the fact that the antistatic ability is lost via the steps such as the developing step using an alkali, the acidic fixing step, and the step of washing. Therefore, in the case when printing is conducted by further using a treated film as in a printing light-sensitive material, the problems such as pinhole generation by attachment of dust will ensue. For this reason, for example, in Japanese Unexamined Patent Publications No. 84658/1980 and No. 174542/1986, antistatic layers comprising a water-soluble conductive polymer having carboxyl groups, a hydrophobic polymer having carboxyl groups and a polyfunctional aziridine have been proposed. According to this method, antistatic ability can remain after the treatment, but there is a problem that, when curing is not proceeded sufficiently with the polyfunctional aziridine which is a curing agent, antistatic ability will not be exhibited.

SUMMARY OF THE INVENTION

To cope with the problems as described above, an object of the present invention is to provide a method for providing an antistatic layer having sufficient antistatic ability by proceeding a reaction of a curing agent in the antistatic layer after coating and drying of said layer.

The above object of the present invention can be accomplished by a method for providing an antistatic layer containing a water-soluble conductive polymer and a curing agent on a plastic film, which comprises coating an aqueous processing solution containing said water-soluble conductive polymer and said curing agent on said plastic film to have a pH of the surface of the antistatic layer after drying said antistatic layer of 8.5 or less and 2.5 or more.

DESCRIPTION OF THE PREFERRED EMBODIMENTS

In the following, the present invention is explained in more detail.

The water-soluble conductive polymer of the present invention can form a transparent layer even when used alone, but cracks of the layer are caused by a slight fluctuation in drying condition. In the constitution of the present invention, in order to prevent occurrence of such cracks, it is preferred to add hydrophobic polymer particles thereto.

The water-soluble conductive polymer of the present invention may include polymers having at least one conductive group selected from a sulfonic acid group, a sulfate group, a quaternary ammonium salt group, a tertiary ammonium salt group, a carboxyl group and a polyethylene oxide group. Among these groups, a sulfonic acid group, a sulfate group and a quaternary ammonium salt group are preferred. The conductive group is required to be 5% by weight or more per one molecule of the polymer. In the water-soluble conductive polymer, at least one of a hydroxy group, an amino group, an epoxy group, an aziridine group, an active methylene group, a sulfinic acid group, an aldehyde group and a vinylsulfone group are preferably contained.

The polymer may have a molecular weight (Mn) of 3,000 to 100,000, preferably 3,500 to 50,000.

In the following, exemplary compounds of the water-soluble conductive polymers to be used in the present invention are set forth, but the present invention is not limited by these examples at all.

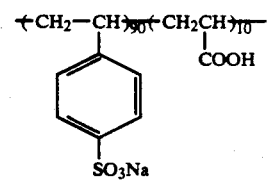

A-1

$\overline{Mn} = 10000$

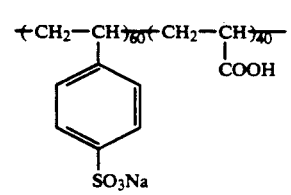

A-2

$\overline{Mn} = 7000$

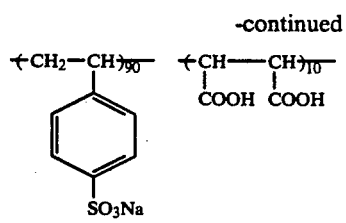 A-3

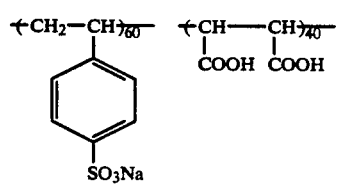 A-4

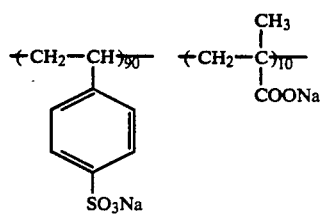 A-5

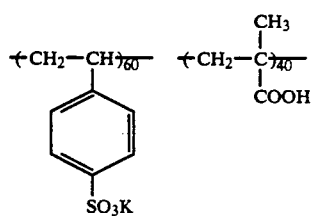 A-6

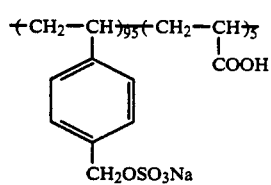 A-7

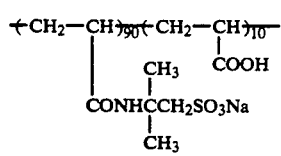 A-8

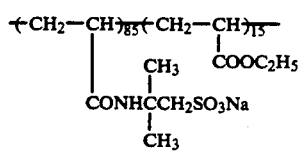 A-9

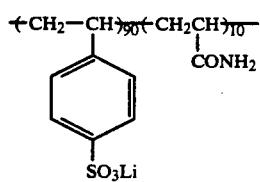 A-10

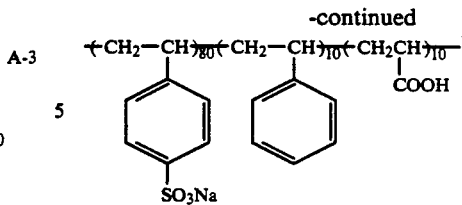 A-11
$\overline{Mn} = 5000$ $\overline{Mn} = 5000$ $\overline{Mn} = 20000$ $\overline{Mn} = 8000$ $\overline{Mn} \approx 25000$ $\overline{Mn} \approx 30000$ $\overline{Mn} \approx 10000$ $\overline{Mn} \approx 6000$ $\overline{Mn} \approx 15000$ Dextran sulfate substitution degree: 3.0, A-12
$\overline{Mn} = 500,000$

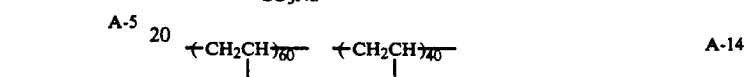 A-13
$\overline{Mn} \approx 10000$

 A-14
x:y = 90:10
$\overline{Mn} = 7000$

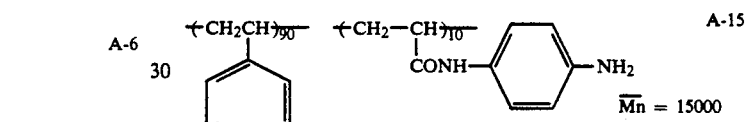 A-15
$\overline{Mn} = 15000$

 A-16
$\overline{Mn} = 5000$

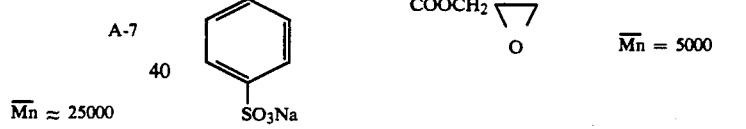 A-17
$\overline{Mn} = 20000$

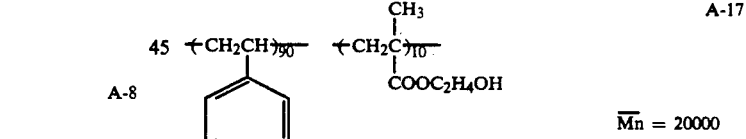 A-18
$\overline{Mn} = 8000$

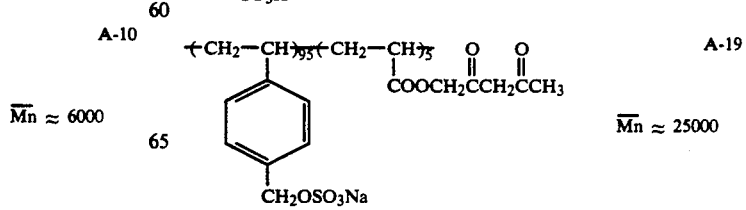 A-19
$\overline{Mn} \approx 25000$

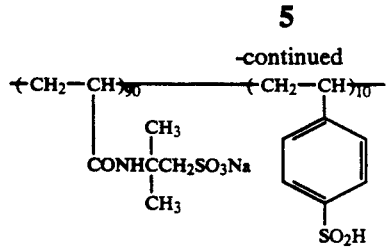
A-20
$\overline{Mn} \approx 30000$

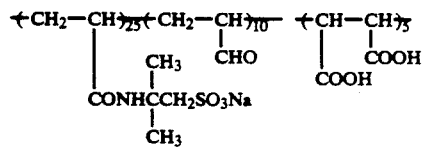
A-21
$\overline{Mn} \approx 10000$

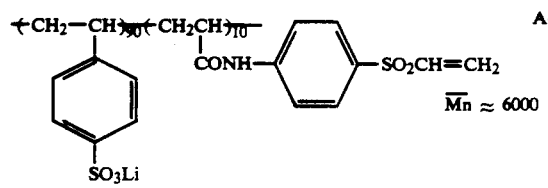
A-22
$\overline{Mn} \approx 6000$

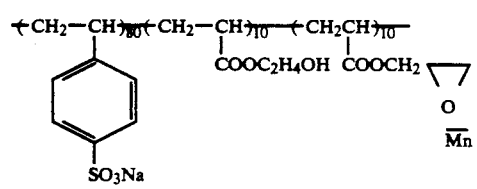
A-23
$\overline{Mn} \approx 15000$

Dextran sulfate
substitution degree: 2.0,
A-24
$\overline{Mn} = 100,000$

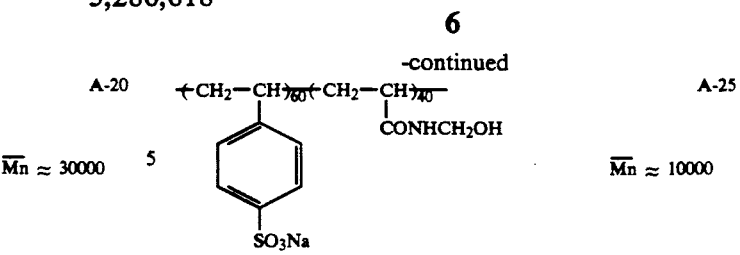
A-25
$\overline{Mn} \approx 10000$

In the above formulae A-1 to A-25, Mn represents an average molecular weight (in the present specification, average molecular weight refers to number average molecular weight), which is a measured value according to GPC represented by polyethylene glycol.

The hydrophobic polymer particles to be contained in the water-soluble conductive polymer of the present invention are composed of the so-called latex substantially insoluble in water. The hydrophobic polymer can be obtained by polymerization of monomers according to any desired combination selected from among styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile. Particularly, those containing 30 mole % or more of styrene derivatives, alkyl acrylates and alkyl methacrylates are preferred, particularly preferably 50 mole % or more.

For making the hydrophobic polymer into the form of a latex, there are two methods, one of which is performing emulsion polymerization and the other is dissolving the polymer in solid state into a low boiling point solvent to be finely dispersed therein, followed by evaporation of the solvent, but the emulsion polymerization method is preferred in the points of fine particle size, and yet with regular sizes.

The molecular weight of the hydrophobic polymer may be 3,000 or higher, and there is no substantial difference in transparency depending on the molecular weight.

Specific examples of the hydrophobic polymer of the present invention are shown below.

B-1

B-2

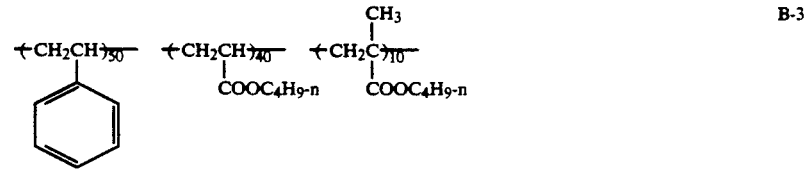
B-3

-continued
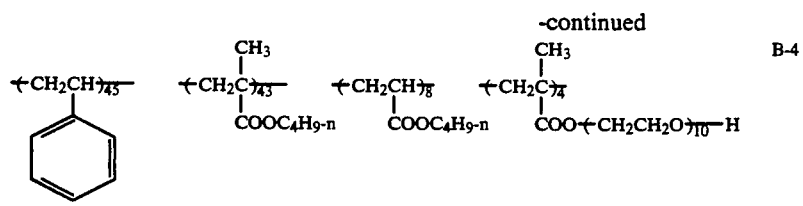 B-4
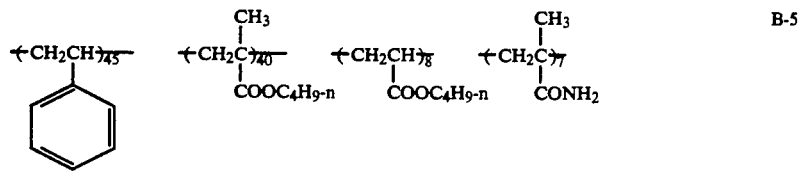 B-5
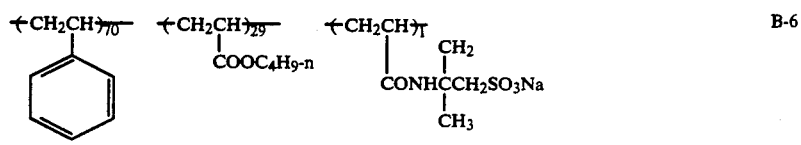 B-6
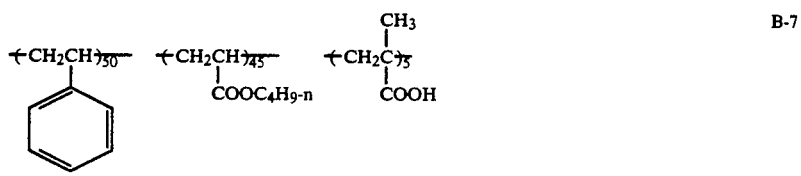 B-7
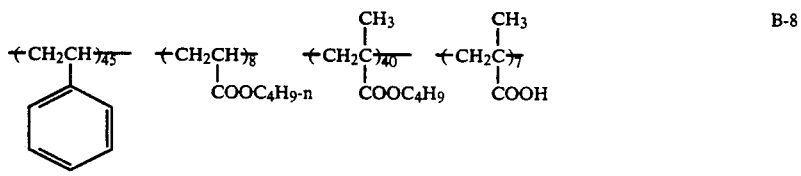 B-8
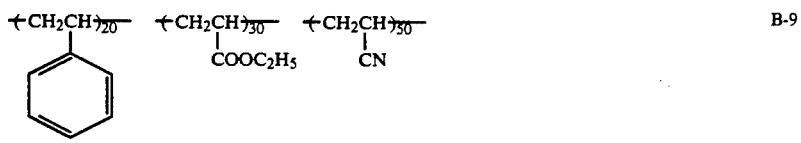 B-9
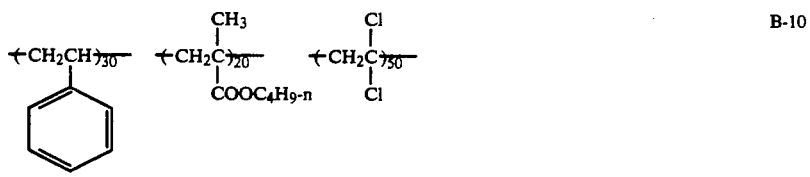 B-10
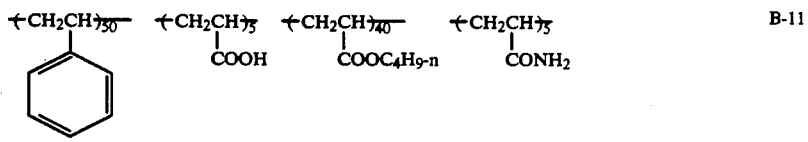 B-11
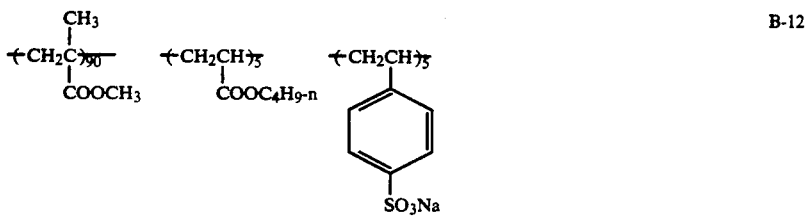 B-12

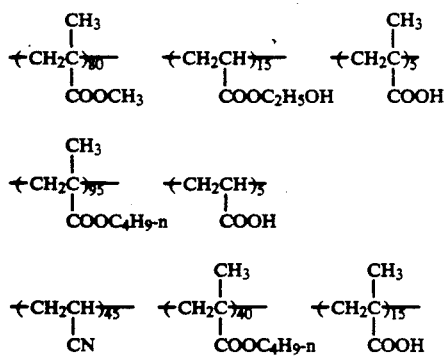

B-13

B-14

B-15

The film thickness of the conductive layer of the present invention is preferably, in dried state, 0.4 to 2.5 μm, particularly preferably 0.5 to 2.0 μm. If it is less than 0.4 μm, sufficient conductivity cannot be obtained after developing processig, while when attempting to make the film more than 2.5 μm, coating processing is extremely difficult and a coated film having good surface smoothness cannot be obtained.

An amount of the hydrophobic polymer is preferably 5 to 60% by weight, more preferably 10 to 40% by weight based on the water-soluble polymer and an amount of the curing agent is preferably 0.5 to 50% by weight, more preferably 5 to 30% by weight based on the same.

In the present invention, as the method for making a pH of the film surface 8.5 or less and 2.5 or more after drying of the coated aqueous processing solution, it is preferred to use and coat an aqueous processing solution to which a salt is added. As the salt, preferred are those of a strong acid and a weak base such as ammonium sulfate, ammonium phosphate, ammonium hydrogen phosphate, ammonium dihydrogen phosphate, ammonium chloride, ammonium lactate and ammonium citrate. As the weak base, ammonia is particularly preferred.

The amount of the salt to be added is preferably 0.1 to 20% by weight, more preferably 1 to 10% by weight, based on the conductive polymer.

The pH of the film surface is preferably 8.0 or less, but too low pH value is not preferred in the point of stability of the film. If the pH of the film surface is less than 2.5, the water-soluble polymer is likely precipitated and thus a transparent film can hardly be obtained. The pH of 3.0 to 7.5 is particularly preferred.

The curing agent for curing the conductive layer of the present invention may preferably include a polyfunctional aziridine compound and a hydroxy group-containing epoxy compound. The aziridine compound may be preferably bifunctional or trifunctional, with a molecular weight of 7,000 or lower. The hydroxy group-containing epoxy compound may be preferably an epihalohydrin-addition product of polyglycidol.

The conductive layer of the present invention may be on the support side relative to the light-sensitive layer, or on the opposite side of the support relative to the light-sensitive layer, namely the back surface.

In the present invention, the conductive layer is provided on a transparent support by coating. As the transparent support, all supports for photography can be used, but preferably polyethylene terephthalate or cellulose triacetate prepared so as to transmit 90% or more of visible light.

These transparent supports can be prepared by the methods well known to those skilled in the art, but in some cases, a dye may be slightly added to give slight blue tint substantially without interfering with light transmission.

The support of the present invention may also have a subbing layer containing a latex polymer provided by coating after corona discharging treatment. The corona discharging treatment may be applied particularly preferably at 1 mW to 1 KW/m$^2$·min as the energy value. Also, particularly preferably, corona discharging treatment is effected again before coating of the conductive layer after coating of the latex subbing layer.

The present invention can be applied to substantially all light-sensitive materials formed on supports. For example, they are light-sensitive silver halide color materials, light-sensitive materials for roentgenogram and light-sensitive materials for printing plates.

The silver halide emulsion to be used in the present invention can be stabilized by using the compounds as disclosed in U.S. Pat. No. 2,444,607, U.S. Pat. No. 2,716,062 and U.S. Pat. No. 3,512,982, West German Patent Publications No. 1,189,380, No. 2,058,626 and No. 2,118,411, Japanese Patent Publication No. 4133/1968, U.S. Patent No. 3,342,596, Japanese Patent Publication No. 4417/1972, West German Patent Publication No. 2,149,789, Japanese Patent Publications No. 2825/1964 and No. 13566/1974, preferably, for example, 5,6-trimethylene-7-hydroxy-S-triazolo(1,5-a)pyrimidine, 5,6-tetramethylene-7-hydroxy-S-triazolo(1,5-a)pyrimidine, 5-methyl-7-hydroxy-S-triazolo(1,5-a)pyrimidine, 7-hydroxy-S-triazolo(1,5-a)pyrimidine, 5-methyl-6-bromo-7-hydroxy-S-triazolo(1,5-a)pyrimidine, gallic acid esters (e.g. isoamyl gallate, dodecyl gallate, propyl gallate and sodium gallate), mercaptans (1-phenyl-5-mercaptotetrazole and 2-mercaptobenzthiazole), benzotriazoles (5-bromobenztriazole, 5-methylbenztriazole) and benzimidazoles (6-nitrobenzimidazole).

In the light-sensitive silver halide photographic material according to the present invention and/or the developing solution, an amino compound can be contained.

For enhancing developability, a developing agent such as phenidone or hydroquinone, or an inhibitor such as benzotriazole can be contained on the emulsion side. Alternatively, for enhancing the processing ability of the processing solution, a developing agent or an inhibitor can be contained in the backing layer.

The hydrophilic colloid to be used particularly advantageously in the prevent invention is gelatin.

The gelatin to be used in the present invention may include both of alkali treated and acid treated gelatins. However, when osscein gelatin is used, it is preferred to remove calcium or iron. The content of calcium may be preferably 1 to 999 ppm, more preferably 1 to 500 ppm, and the content of iron may be preferably 0.01 to 50 ppm, more preferably 0.1 to 10 ppm. A method for thus controlling the amount of calcium or iron can be accomplished by passing an aqueous gelatin solution through an ion exchange device.

The developing agent to be used for development of the light-sensitive silver halide photographic material according to the present invention may include catechol, pyrogallol and derivatives thereof, and ascorbic acid, chlorohydroquinone, bromohydroquinone, methylhydroquinone, 2,3-dibromohydroquinone, 2,5-diethylhydroquinone, 4-chlorocatechol, 4-phenyl-catechol, 3-methoxy-catechol, 4-acetyl-pyrogallol and sodium ascorbate.

Also, $HO-(CH=CH)_n-NH_2$ type developer may typically include o- and p-aminophenols, and specifically includes 4-aminophenol, 2-amino-6-phenylphenol, 2-amino-4-chloro-6-phenylphenol and N-methyl-p-aminophenol.

Further, examples of $H_2N-(CH=CH)_n-NH_2$ type developer may include 4-amino-2-methyl-N,N-diethylaniline, 2,4-diamino-N,N-diethylaniline, N-(4-amino-3-methylphenyl)-morpholine and p-phenylenediamine.

Heterocyclic type developer may include 3-pyrazolidones such as 1-phenyl-3-pyrazolidone, 1-phenyl-4,4-dimethyl-3-pyrazolidone and 1-phenyl-4-methyl-4-hydroxymethyl-3-pyrazolidone, and 1-phenyl-4-amino-5-pyrazolone and 5-aminouracil.

In the present invention, there may be effectively used the developers as described in T. H. James, "The Theory of the Photographic Process", Fourth Edition, pp. 291–334 and Journal of the American Chemical Society, Vol. 73, p. 3,100 (1951). These developers can be used either singly or in combination of two or more kinds, but preferably in combination of two or more kinds. Also, in the developing solution to be used for development of the light-sensitive material according to the present invention, for example, sulfites such as sodium sulfite and potassium sulfite can be used as the preservative without impairing the effect of the present invention. Also, as the preservative, hydroxylamine and hydrazide compounds can be used, and in this case, the amount of such compounds used may be preferably 5 to 500 g, more preferably 20 to 200 g per liter of the developing solution.

Also, in the developing solution, glycols may be contained as the organic solvent, and examples of such glycols may include ethylene glycol, diethylene glycol, propylene glycol, triethylene glycol, 1,4-butanediol and 1,5-pentanediol, but diethylene glycol may be preferably used. The amount of these glycols used may be preferably 5 to 500 g, more preferably 20 to 200 g per liter of the developing solution. These organic solvents can be used either alone or in combination.

The light-sensitive silver halide photographic material according to the present invention can give a light-sensitive material extremely excellent in storage stability by performing development processing by use of a developing solution containing a developing inhibitor as described above.

The pH value of the developing solution comprising the above composition may be preferably 9 to 13, but the pH value in the range of 10 to 12 is more preferred in preservability and photographic characteristics. As for the cations in the developing solution, a developer with higher potassium ion ratio than sodium ion is preferred for enhancing the activity of the developing solution.

The light-sensitive silver halide photographic material according to the present invention can be processed according to various conditions. The processing temperature may be preferably a developing temperature of 50° C. or lower, particularly preferably around 25° C. to 40° C., and the development is generally accomplished within 2 minutes, particularly preferably from 10 seconds to 50 seconds to bring about preferred effects in many cases. Also, other processing steps than developing, for example, washing, stopping, stabilizing and fixing, further, if necessary, pre-film hardening and neutralization can be employed as desired, and these can be also omitted suitably. Further, these treatments may be also the so-called manual development processing such as dish development and frame development or mechanical development such as roller development and hanger development.

The present invention is described in detail by referring to Examples. As a matter of course, the present invention is not limited by these Examples as described below at all.

EXAMPLE 1

On a polyethylene terephthalate support applied to subbing treatment after corona discharging, followed further by corona discharging were coated an antistatic solution having the composition shown below by using an air knife coater at a speed of 50 m/min so as to become an amount of 10 ml/m².

| | |
|---|---|
| Water-soluble conductive polymer (A) | 60 g/l |
| Hydrophobic polymer particle (B) | 40 g/l |
| Ammonium sulfate | 0.5 g/l |
| Film hardener (H-1) | 12 g/l |

The solution having the above composition was made 1 liter.

The coating was dried under the parallel stream conditions of a drying air temperature of 90° C., an overall heat transfer coefficient of 25 Kg/m²·hr·°C. for 30 seconds, followed further by heat treatment at 140° C. for 90 seconds. On the antistatic layer, gelatin was coated to 2.0 g/m², and dried. As the film hardner of gelatin, the (H-2) shown below was employed.

Film hardener (H-2)

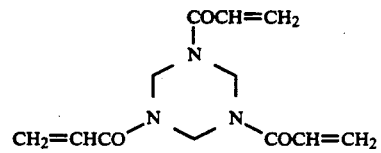

After coating and drying of the aqueous processing solution of the water-soluble conductive polymer, a pH of the film surface was measured at 23° C. by using a pH meter manufactured by Toa Denpa K.K. and plane electrodes.

Also, surface specific resistance was measured at 23° C. under 55% RH (relative humidity) by using a teraohmmeter Model VE-30 manufactured by Kawaguchi Denki K.K.

TABLE 1

| Sample | A | B | Salt | (surface specific resistance Ω) Ω | Film surface pH | Remarks |
|---|---|---|---|---|---|---|
| 1 | 3 | 4 | Ammonium sulfate | $5.5 \times 10^8$ | 6.5 | This invention |
| 2 | 3 | 5 | Ammonium sulfate | $5.4 \times 10^8$ | 6.8 | " |
| 3 | 8 | 4 | Ammonium sulfate | $5.5 \times 10^8$ | 6.5 | " |
| 4 | 8 | 5 | Ammonium sulfate | $5.5 \times 10^8$ | 6.8 | " |
| 5 | 9 | 8 | Ammonium phosphate | $5.7 \times 10^8$ | 6.8 | " |
| 6 | 3 | 5 | — | $9.0 \times 10^8$ | 9.0 | Comparative |

From the results in Table 1, in the samples of the present invention, the pH of the film surface is low and the surface specific resistance is small as compared with the comparative sample.

EXAMPLE 2

Under acidic atmosphere of pH 3.0, particles containing $10^{-5}$ mole of rhodium per one mole of silver were prepared according to the control double jet method. The particles were grown in a system containing 30 mg of benzyladenine per one liter of an aqueous 1% gelatin solution. After mixing of silver and a halide, 600 mg of 6-methyl-4-hydroxy-1,3,3a,7-tetrazaindene was added per 1 mole of silver halide, followed by washing and desalting.

Subsequently, 60 mg of 6-methyl-4-hydroxy-1,3,3a,7-tetrazaindene was added per one mole of silver halide, followed by sulfur sensitization. After sulfur sensitization, 6-methyl-4-hydroxy-1,3,3a,7-tetrazaindene was added as a stabilizer.

Silver halide emulsion layer

To the above respective emulsions, the following additives were added by controlling the attached amounts to those shown below, and each mixture was coated on a polyethylene terephthalate support subjected to poly(styrene-butyl acrylate-glycidyl methacrylate) latex subbing treatment (100 μm thickness).

| | |
|---|---|
| Latex polymer: styrene-butyl acrylate-acrylic acid ternary copolymer | 1.0 g/m² |
| Tetraphenylphosphonium chloride | 30 mg/m² |
| Saponin | 200 mg/m² |
| Polyethylene glycol | 100 mg/m² |
| Sodium dodecylbenzenesulfonate | 100 mg/m² |
| Hydroquinone | 200 mg/m² |
| Phenidone | 100 mg/m² |
| Sodium styrenesulfonate-maleic acid copolymer (Mw = 250,000) | 200 mg/m² |
| Butyl gallate | 500 mg/m² |
| Tetrazolium compound | 20 mg/m² |
| 5-Methylbenzotriazole | 30 mg/m² |
| 2-Mercaptobenzimidazole-5-sulfonic acid | 30 mg/m² |
| Inert osscein gelatin (isoelectric point 4.9) | 1.5 g/m² |
| 1-(p-Acetylamidophenyl)-5-mercaptotetrazole | 30 mg/m² |
| Silver quantity | 2.8 g/m² |
| Tetrazolium compound | |

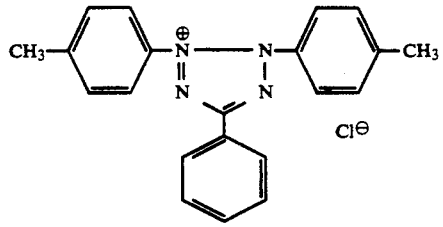

Emulsion layer protective film

As the emulsion layer protective film, the composition was prepared and coated to the attached amounts shown below.

| | |
|---|---|
| Fluorinated dioctylsulfosuccinic acid ester | 300 mg/m² |
| Matte agent: polymethyl methacrylate (average particle size 3.5 μm) | 100 mg/m² |
| Lithium nitrate | 30 mg/m² |
| Acid-treated gelatin (isoelectric point 7.0) | 1.2 g/m² |
| Colloidal silica | 50 mg/m² |
| Sodium styrenesulfonate-maleic acid copolymer | 100 mg/m² |
| Mordant: | 30 mg/m² |

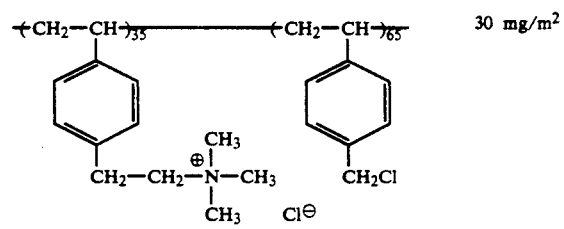

Dye:

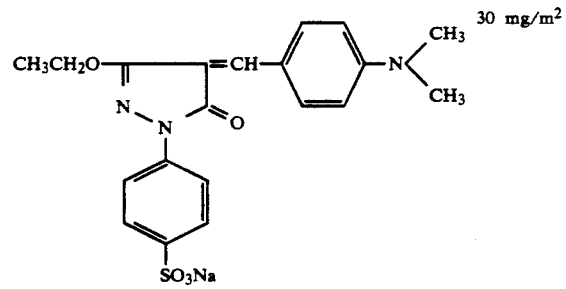

Backing layer

On the support of the opposite side to the emulsion layer, after corona discharging with a power of 30 W/m²·min previously, a poly(styrene-butyl acrylate-glycidyl methacrylate) latex polymer was coated in the presence of a hexamethyleneaziridine film hardener, and further the antistatic layer of the present invention was provided by coating thereon in the same manner as in Example 1. Subsequently, a backing layer containing a backing dye having the composition shown below was coated on the layer. The gelatin layer was hardened with glyoxal, 1-oxy-3,5-dichloro-S-triazine sodium salt and the (H-3) shown below which is a hydroxy-containing epoxy compound.

H-3: Reaction product of polyglycidol and epichlorohydrin (Backing layer)

-continued

| H-3: Reaction product of polyglycidol and epichlorohydrin | |
|---|---|
| Hydroquinone | 100 mg/m² |
| Phenidone | 30 mg/m² |
| Latex polymer: butyl acrylate-styrene copolymer | 0.5 g/m² |
| Styrene-maleic acid copolymer | 100 mg/m² |
| Citric acid | 40 mg/m² |
| Benzotriazole | 100 mg/m² |
| Styrenesulfonic acid-maleic acid copolymer | 100 mg/m² |
| Lithium nitrate | 30 mg/m² |
| Backing dyes (a), (b) and (c) | |
| Osccein gelatin | 2.0 g/m² |
| Backing dye (a) | 40 mg/m² |

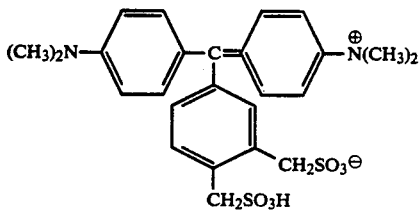

Backing dye (b) 30 mg/m²

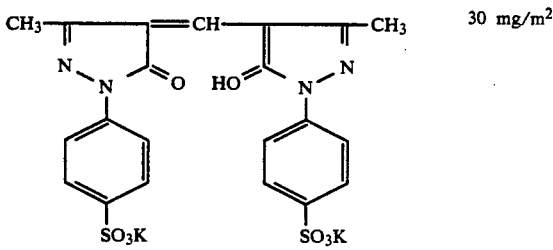

Backing dye (c) 30 mg/m²

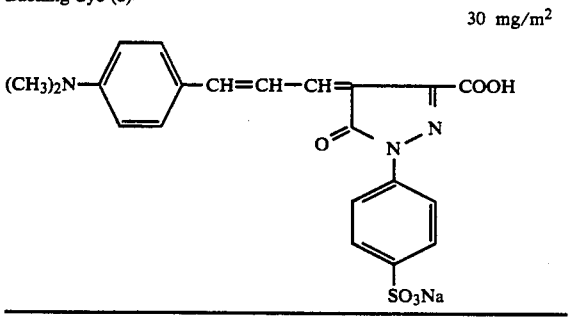

The samples obtained as described above were subjected to whole surface exposure, and developed by using the developing solution and the fixing solution shown below, followed by surface specific resistance test.

| <Developing solution recipe> | |
|---|---|
| Hydroquinone | 25 g |
| 1-Phenyl-4,4-dimethyl-3-pyrazolidone | 0.4 g |
| Sodium bromide | 3 g |
| 5-Methylbenzotriazole | 0.3 g |

| -continued | |
|---|---|
| 5-Nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| (made up to one liter with water, pH was adjusted to 11.5 with caustic soda) | |
| <Fixing solution recipe> | |
| (Composition A) | |
| Ammonium thiosulfate (72.5% by weight aqueous solution) | 240 ml |
| Sodium sulfite | 17 g |
| Sodium acetate.trihydrate | 6.5 g |
| Boric acid | 6 g |
| Sodium citrate.dihydrate | 2 g |
| Acetic acid (90% by weight aqueous solution) | 13.6 ml |
| (Composition B) | |
| Pure water (deionized water) | 17 ml |
| Sulfuric acid (50% by weight aqueous solution) | 3.0 g |
| Aluminum sulfate (aqueous solution containing 8.1% by weight content calculated on Al₂O₃) | 20 g |

During use of the fixing solution, the above composition A and the composition B were dissolved in 500 ml of water in this order, and made up to one liter before use. The fixing solution had a pH of about 5.6.

| <Developing processing conditions> | | |
|---|---|---|
| (Step) | (Temperature) | (Time) |
| Developing | 40° C. | 8 sec |
| Fixing | 35° C. | 8 sec |
| Washing | Normal temperature | 10 sec |

Evaluation was performed as described below, and the results are shown in Table 2.

TABLE 2

| | | | | (surface specific resistance Ω) | | |
|---|---|---|---|---|---|---|
| Sample | A | B | Salt | Ω | Film surface pH | Remarks |
| 1 | 3 | 4 | Ammonium sulfate | 5 × 10¹⁰ | 6.5 | This invention |
| 2 | 3 | 5 | Ammonium sulfate | " | 6.8 | " |
| 3 | 8 | 4 | Ammonium sulfate | " | 6.5 | " |
| 4 | 8 | 5 | Ammonium sulfate | " | 6.8 | " |
| 5 | 9 | 8 | Ammonium phosphate | " | 6.8 | " |
| 6 | 3 | 5 | — | 5 × 10¹¹ | 8.8 | Comparative |

From the results in Table 2, according to the present invention, it can be understood that excellent antistatic ability is maintained even after developing processing.

Also, when the tetrazolium compound in the emulsion layer was replaced with the hydrazine compound shown below, the same effect could be obtained.

Hydrazine compound:

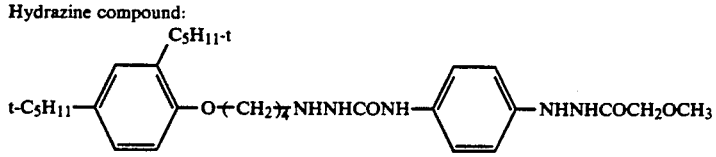

EXAMPLE 3

In the same manner as in Example 2 except for changing amounts of ammonium sulfate and sulfuric acid, antistatic layers having a pH of the suface of 2.0, 2.5, 4.0. 6.5. 8.5 or 9.0 were prepared, respectively. As the polymers to be used, A-3 mentioned above was used as the conductive polymer and B-5 as the hydrophobic polymer.

The same evaluation test as in Example 2 was carried out. The results are shown in Table 3.

TABLE 3

| Sample | Amount of ammonium sulfate (g/l) | Surface specific resistance Ω | Film surface pH | Remarks |
|---|---|---|---|---|
| 1 | 6.0 | $1 \times 10^{13}$ | 2.0 | Comparative |
| 2 | 6.0 | $5 \times 10^{11}$ | 2.5 | This invention |
| 3 | 4.5 | $1 \times 10^{11}$ | 4.0 | This invention |
| 4 | 0.5 | $5 \times 10^{11}$ | 6.5 | This invention |
| 5 | 0.5 | $1.0 \times 10^{12}$ | 8.5 | This invention |
| 6 | 0.5 | $1.0 \times 10^{13}$ | 9.0 | Comparative |

(surface specific resistance Ω)

Surface specific resistance was measured at 23° C. and 20% relative humidity.

According to the present invention, an excellent method for coating an antistatic layer of a light-sensitive silver halide photographic material without any deterioration of antistatic ability and yet without deterioration of antistatic ability even after developing processing could be obtained.

We claim:

1. In a method for providing an antistatic layer which can withstand wet photographic processing on a plastic film for a photographic material, said antistatic layer being formed by reacting hydrophobic polymer particles, a water-soluble conductive polymer and a polyfunctional aziridine compound or a hydroxy group containing epoxy compound as a curing agent, the improvement comprising:

preparing a solution for providing said antistatic layer, said solution comprising the hydrophobic polymer particles, the water-soluble conductive polymer, and the curing agent coating said solution on said plastic film to form a coated layer, and drying said coated layer;

wherein said conductive polymer contains a conductive group selected from the group consisting of a sulfonic acid group, a sulfate group, a quaternary ammonium salt group, a tertiary ammonium salt group, a carboxy group and a polyethylene oxide group in an amount of not less than 5% by weight in a molecule of said conductive polymer, said hydrophobic polymer particles are provided to said solution in a form of latex obtained by polymerization of monomers selected from the group consisting of styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile, and said coating solution further contains a salt of a strong acid and a weak base in an amount of 0.1 to 20% by weight based on said water-soluble conductive polymer so that the surface pH of said antistatic layer after said drying is in the range of 2.5 to 8.5.

2. The method according to claim 1 wherein said salt is selected from the group consisting of ammonium sulfate, ammonium phosphate, ammonium hydrogen phosphate, ammonium dihydrogen phosphate, ammonium chloride, ammonium lactate and ammonium citrate.

3. The method according to claim 2, wherein an amount of the salt is 1 to 10% by weight based on the conductive polymer.

4. The method according to claim 1, wherein a pH of the film surface is 3.0 to 7.5.

5. The method according to claim 3, wherein said water-soluble conductive polymer has at least one conductive group selected from the group consisting of a sulfonic acid group, a sulfate group, a quaternary ammonium salt group, a tertiary ammonium salt group, and a polyethylene oxide group.

6. The method according to claim 1, wherein the polymer has a number average molecular weight of 3,000 to 100,000.

7. The method according to claim 1, wherein said hydrophobic polymer particles are composed of latex obtained by polymerization of monomers selected from the group consisting of styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile.

8. The method according to claim 1, wherein said aziridine compound is used as the curing agent and is bifunctional or trifunctional and has a molecular weight of 7,000 or less.

9. The method according to claim 1, wherein said hydroxy group-containing epoxy compound is used as the curing agent and is an epihalohydrin adduct of polyglycidol.

* * * * *